(12) United States Patent
Schaub et al.

(10) Patent No.: US 7,860,681 B1
(45) Date of Patent: Dec. 28, 2010

(54) DYNAMIC ANALYZER OF A MECHANICAL MOTION TRANSMISSION SYSTEM

(76) Inventors: Stanley R. Schaub, 536 5th St., Manhattan Beach, CA (US) 90286; Pieter Van Vliet, 21, rue Principale, Kahler, Grand Duchè de Luxembourg (NL) L-8376

( * ) Notice: Subject to any disclaimer, the term of this patent is extended or adjusted under 35 U.S.C. 154(b) by 0 days.

(21) Appl. No.: 12/148,825

(22) Filed: Apr. 23, 2008

Related U.S. Application Data

(60) Provisional application No. 60/925,759, filed on Apr. 23, 2007.

(51) Int. Cl.
 *G01C 9/00* (2006.01)
(52) U.S. Cl. ........................ 702/151; 702/145; 702/150; 702/153; 73/1.79; 73/54.33; 73/854; 356/482; 356/486; 356/492; 356/493; 356/614
(58) Field of Classification Search ................ 702/145, 702/150, 151, 152, 153; 73/1.79, 54.33, 73/854; 356/482, 486, 492, 493, 498, 614
See application file for complete search history.

(56) References Cited

U.S. PATENT DOCUMENTS

| 4,320,662 A | 3/1982 | Schaub |
| 2004/0047036 A1* | 3/2004 | Baun et al. .................. 359/430 |
| 2008/0134783 A1* | 6/2008 | Jeng et al. ................ 73/514.01 |

* cited by examiner

*Primary Examiner*—Sujoy K Kundu
(74) *Attorney, Agent, or Firm*—Patrick Bright

(57) ABSTRACT

Combination is disclosed for deriving and displaying the full complement of nine dynamic parameters associated with a mechanical motion transmission system; the parameters comprise: (1) angular displacement, (2) angular velocity, (3) angular acceleration, (4) moment of force (i.e. torque), (5) kinetic energy, (6) work, (7) power, (8) momentum and (9) impulse. Quasi-instantaneous, absolute measurements are derived from elapsed-time measurements between successive sensing of fixed, equal, position events such as electric pulses generated by an incremental shaft encoder. The parameters are displayed on the X and Y axes of a Cartesian or other suitable graph where the X-axis (i.e. the independent axis) indicates the angular displacement of the encoder expressed as a succession of fixed, equal position events in the units of radians. The Y-axis (i.e. the dependent axis) indicates the absolute value of the parameters.

18 Claims, 10 Drawing Sheets

| # | Dynamic Parameter | Phase Domain Equations | | Units | |
|---|---|---|---|---|---|
| | | | | U.S. Conventional | International (SI) |
| 1 | Displacement ($\Theta$) | $\Theta_1 = K_1$<br>$\Theta_2 = K_1 + K_2$ | $\Theta_n = K_1 + K_2 + \ldots K_n$<br>where: $K = \frac{2\pi}{R}$ | rad | rad |
| 2 | Velocity ($\omega$) | $\omega_1 = K/\overline{t_1}$<br>$\omega_2 = K/\overline{t_2}$ | $\omega_n = K/\overline{t_n}$ | rad/s | rad/s |
| 3 | Acceleration ($\alpha$) | $\alpha_1 = (\omega_1 - \omega_n)/\overline{t_1}$<br>$\alpha_2 = (\omega_2 - \omega_1)/\overline{t_2}$ | $\alpha_n = (\omega_n - \omega_{n-1})/\overline{t_n}$ | $rad/s^2$ | $rad/s^2$ |
| 4 | Moment of Force (M) (Torque) | $M_1 = I_o \alpha_1$<br>$M_2 = I_o \alpha_2$ | $M_n = I_o \alpha_n$ | lb-ft | N.m |
| 5 | Kinetic Energy (T) | $T_1 = \frac{1}{2} I_o \omega_1^2$<br>$T_2 = \frac{1}{2} I_o \omega_2^2$ | $T_n = \frac{1}{2} I_o \omega_n^2$ | ft-lb | N.m=J |
| 6 | Work (U) = $\Delta T$ | $U_1 = T_1 - T_0$<br>$U_2 = T_2 - T_1$ | $U_n = T_n - T_{n-1}$ | ft-lb | N.m=J |
| 7 | Power (P) | $P_1 = M_1 [\omega_a]_1$<br>$P_2 = M_2 [\omega_a]_2$ | $P_n = M_n [\omega_a]_n$<br>a=average | ft-lb/s<br>1hp=550ft-lb/s<br>=745.7W | J/s=W<br>1hp=735.5W |
| 8 | Momentum ($H_o$) | $(H_o)_1 = I_o \omega_1$<br>$(H_o)_2 = I_o \omega_2$ | $(H_o)_n = I_o \omega_n$ | lb-s-ft | N.m.s |
| 9 | Impulse ($I_{mp}$) = $\Delta H_o$<br>$= \int_{t_1}^{t_2} M dt$ | $(I_{mp})_1 = I_o(\omega_1 - \omega_n)$<br>$(I_{mp})_2 = I_o(\omega_2 - \omega_1)$ | $(I_{mp})_m = I_o(\omega_n - \omega_{n-1})$ | lb-s-ft | N.m.s |
| | Category I | Category II | | | |

FIG. 8

| | | Dynamic Parameter | Phase Domain Equations | Units | |
|---|---|---|---|---|---|
| | | | | U.S. Conventional | International (SI) |
| Category I | 1 | Displacement (S) | $S_1 = L_1$<br>$S_2 = L_1 + L_2$<br>$S_n = L_1 + L_2 + ... L_n$<br>where: L = length | ft | m |
| | 2 | Velocity ($\nu$) | $\nu_1 = L/\overline{t}_1$<br>$\nu_2 = L/\overline{t}_2$ | $\nu_n = L/\overline{t}_n$ | ft/s | m/s |
| | 3 | Acceleration ($a$) | $a_1 = (\nu_1 - \nu_n)/\overline{t}_1$<br>$a_2 = (\nu_2 - \nu_1)/\overline{t}_2$ | $a_n = (\nu_n - \nu_{n-1})/\overline{t}_n$ | ft/s² | m/s² |
| Category II | 4 | Force (F) | $F_1 = \overline{m}a_1$<br>$F_2 = \overline{m}a_2$ | $F_n = \overline{m}a_n$<br>$\overline{m}$ = mass | lb | N |
| | 5 | Kinetic Energy (T) | $T_1 = \frac{1}{2}\overline{m}\nu_1^2$<br>$T_2 = \frac{1}{2}\overline{m}\nu_2^2$ | $T_n = \frac{1}{2}\overline{m}\nu_n^2$ | ft-lb | J |
| | 6 | Work (U) = $\Delta$T | $U_1 = T_1 - T_0$<br>$U_2 = T_2 - T_1$ | $U_n = T_n - T_{n-1}$ | ft-lb | J |
| | 7 | Power (P) | $P_1 = F_1[\nu_n]_1$<br>$P_2 = F_2[\nu_n]_2$ | $P_n = F_n[\nu_n]_n$<br>a = average | ft-lb/s<br>1hp=745.7W | W<br>1hp=735.5W |
| | 8 | Momentum (G) | $G_1 = \overline{m}\nu_1$<br>$G_2 = \overline{m}\nu_2$ | $G_n = \overline{m}\nu_n$ | lb-s | N.s |
| | 9 | Impulse ($I_{mp}$) = $\Delta G$<br>= $\int_{t_1}^{t_2} F \, dt$ | $(I_{mp})_1 = \overline{m}(\nu_1 - \nu_n)$<br>$(I_{mp})_2 = \overline{m}(\nu_2 - \nu_1)$ | $(I_{mp})_n = \overline{m}(\nu_n - \nu_{n-1})$ | lb-s | N.s |

FIG. 9

DYNAMIC ANALYZER OF A MECHANICAL MOTION TRANSMISSION SYSTEM

This application claims the benefit of filing date and disclosure of U.S. provisional patent application filed Apr. 23, 2007, Ser. No. 60/925,759, entitled "Dynamic Analyzer of a Mechanical Motion Transmission System."

FIELD OF APPLICATION

This invention relates to the field of machine condition-monitoring. The invention can provide an internal dynamic picture of a machine operating from startup, through steady-state operation to final shutdown. This information can be used to assess the condition or "health" of the machine, to detect and isolate faults, and to predict the time-to-failure by way of trend analysis (i.e. plotting measurements on a periodic basis).

The following is a description of several features of the invention.

1) Measurements associated with the following nine dynamic parameters are provided: angular displacement, angular velocity, angular acceleration, moment of force (i.e. torque), kinetic energy, work, power, momentum and impulse.

Dynamic measurements (nine total) associated with rectilinear motion can also be derived by utilizing an incremental encoder which measures rectilinear motion.

2) The dynamic parameters are expressed and displayed in quasi-instantaneous values with absolute units. Displaying the parameters in quasi-instantaneous values allows one to detect perturbations (i.e. dynamic changes) in the parameters. Any cyclic perturbations can indicate a faulty machine element (i.e. a damaged gear tooth, unbalanced shaft, etc.). Because parameters may be expressed in absolute units, it is feasible to determine the actual forces arising within the machine elements.

3) The measurements may be displayed in the phase-domain (i.e. the X-independent axis is expressed as angular position rather than time). This allows one to readily isolate a fault within the machine cycle independent of machine speed.

4) The invention operates entirely upon digital principles. Thus, measurements are highly accurate, repeatable and no calibration is required.

5) A capability exists to transmit all parametric data to a remote location by electronic mail (without data conversion) for follow-on analysis and/or data storage. This is possible because the output of the invention is in digital-numeric format.

Another application of this invention lies in the field of education related to engineering dynamics (i.e. kinematics and kinetics). Classroom demonstrations and laboratory experiments can now be performed which, heretofore, have not been possible; an example being the turntable test which is briefly described below.

Test Setup

An incremental shaft encoder is co-mounted on a turntable shaft. The output of the encoder is applied to the invention.

Conduction of Test

An object is placed on a turntable which is initially at rest. The motor is turned on and the turntable begins to accelerate.

Test Criteria

At the instant the object is ejected from the turntable, an instantaneous increase in the angular velocity and acceleration measurement will occur at the output of the Dynamic Analyzer.

The invention may also serve as a powerful research tool; e.g., gear transmission research. Examples of two possible research efforts are (1) the evaluation of various gear tooth profiles and (2) the development of a diagnostic library. The latter consists of a series of dynamic graphs which reflect various faulty conditions associated with specific types and models of equipment. The graphs are accrued by way of research studies and operational experience.

PRINCIPLES SUPPORTING THE INVENTION

The present invention operates upon a new fundamental principle termed Phase-Domain Processing (PDP). PDP adds a third dimension to the field of IT (Information technology); the other two dimensions being the traditional time- and frequency-domains. PDP unifies the instrumentation in the field of dynamics because only one variable is required to generate the dynamic parameters.

Generating the Phase-Domain

The nine dynamic parameters are derived from elapsed-time measurements between successive sensing of fixed, equal, position events such as electric pulses generated by an incremental shaft encoder.

The parameters may be displayed on the X and Y axis of a Cartesian or other suitable graph. The X-axis indicates the displacement or phase of the encoder expressed as a succession of the position events (i.e. pulses); thus, the name Phase-Domain Processing. The Y-axis (i.e. the dependent axis) indicates the absolute values of the parameters.

Generating the Dynamic Parameters

The first three parameters are termed the kinematic parameters and are referred to as the Category I parameters. The remaining six are the kinetic parameters and are referred to as the Category II parameters. These names minimize the potential confusion which sometimes arises between the words kinematic and kinetic.

The differences between the Category I and II parameters are as follows. The Category I parameters deal with the geometry and the time-dependent aspects of motion without considering the forces causing the motion. The Category II parameters are based on kinematics and include the effects of forces on masses.

Regarding the dynamic parameters and their subsequent derivation. We have found that 1) A mechanical motion transmission system can encompass several types of motion; e.g.: rotation about a fixed axis, rectilinear translation, curvilinear translation and general plane motion (i.e. rotation plus translation). As such, both angular position and rectilinear motion sensors can be utilized in the phase-domain process. The sensors should be capable of detecting incremental motion.

2) The phase-domain equations are based upon planar (i.e. two-dimensional) dynamics, since the incremental motion sensor is a two-dimensional device (i.e. it rotates or translates in the X-Y plane).

3) Although the phase-domain equations for both angular and rectilinear motion are provided herein, only the angular motion parameters are derived because the general form of both sets of equations are, in principle, derived in the same manner. Only the units of measurement differ.
4) The phase-domain equations are expressed in the International System of units (i.e. the SI units).
5) The symbols associated with the various parameters (i.e. ω=angular velocity, U=work, etc.) are those which are often reflected in texts and handbooks (e.g. Schaum's outline series).
6) The systems and methods encompass both angular and rectilinear motion of machine elements.

Derivation of Category I Parameters

The Category I parameters comprise: angular displacement (θ), angular velocity (ω) and angular acceleration (α). The displacement (θ) is derived from the Phase Segment (K) which is a constant. It is defined as the distance between the pulse pairs generated by the incremental motion sensor (i.e. the encoder) and is expressed in radians.

The velocity (ω) and acceleration (α), on the other hand, are derived from both the Phase Segment (K) and Segment Time ($\bar{t}$). The latter is defined as the elapsed-time in seconds within each successive Phase Segment (K).

The measurements are derived on a segment-by-segment basis (i.e. Phase Segment 1, 2, 3, ... n). The derivation of each parameter follows.

Angular Displacement (θ) in rad

The total angular displacement of a rotating machine element is equal to the sum of the successive phase segments (K) and is expressed as:

$$\theta_1 = K_1 \quad \text{Eq. 1a}$$

$$\theta_2 = K_1 + K_2 \quad \text{Eq. 1b}$$

$$\theta_n = K_1 + K_2 + K_3 + \ldots K_n \quad \text{Eq. 1c}$$

where: K = phase segment size in radians
= 2π/R
(where R = resolution of encoder)
n = Phase Segment number Angular Velocity (ω) in rad/s The average velocity of a rotating machine element within each successive phase segment (K) is equal to the rate of change of displacement; that is, ω=Δθ/Δt. In the case of PDP, Δθ=K and Δt=$\bar{t}$. Therefore, the average velocity occurring within each successive phase segment (K) is expressed as:

$$\omega_1 = \frac{K}{\bar{t}_1} \quad \text{Eq. 2a}$$

$$\omega_2 = \frac{K}{\bar{t}_2} \quad \text{Eq. 2b}$$

$$\omega_n = \frac{K}{\bar{t}_n} \quad \text{Eq. 2c}$$

Velocity is termed quasi-instantaneous not instantaneous. To be referred to as instantaneous, the value of K must approach zero (0). In such a case, however, the value of K would be indeterminate and the Dynamic Analyzer would not function.

Angular Acceleration (α) in rad/s²

The average acceleration of a rotating machine element within each successive phase segment (K) is equal to the rate of change of velocity and is expressed as Δω/Δt; therefore, the average acceleration occurring within each successive phase segment (K) is expressed as:

$$\alpha_1 = (\omega_1 - \omega_0)/\bar{t}_1 \quad \text{Eq. 3a}$$

$$\alpha_2 = (\omega_2 - \omega_1)/\bar{t}_2 \quad \text{Eq. 3b}$$

$$\alpha_n = (\omega_n - \omega_{n-1})/\bar{t}_n \quad \text{Eq. 3c}$$

where: $\omega_0$=angular velocity at the origin of the graph=0 rad

Now, substituting Eq. 2c into Eq. 3c gives the general equation in terms of segment time ($\bar{t}$); that is:

$$\alpha_n = \frac{\left(\frac{K}{\bar{t}_n}\right) - \left(\frac{K}{\bar{t}_{n-1}}\right)}{\bar{t}_n} \quad \text{Eq. 3d}$$

Derivation of Category II Parameters

The Category II parameters comprise: moment of force or torque (M), kinetic energy (T), work (U), power (P), momentum ($H_0$) and impulse ($I_{mp}$). The parameters are derived from the Segment Time ($\bar{t}$) which is a variable and the constants K and $I_0$; the latter being the mass moment of inertia of the rotating system.

Moment of Force or Torque (M) in N·m (newton·meters)

The average torque generated by a rotating machine within each successive phase segment (K) is expressed as:

$$M_1 = I_0 \alpha_1 \quad \text{Eq. 4a}$$

$$M_2 = I_0 \alpha_2 \quad \text{Eq. 4b}$$

$$M_n = I_0 \alpha_n \quad \text{Eq. 4c}$$

where:
M=torque in N·m
$I_0$=mass moment of inertia of the rotating system in kg·m²
α=acceleration in rad/s²

Now, substituting Eq. 3d into Eq. 4c gives the general equation in terms of Segment Time ($\bar{t}$), that is:

$$M_n = \frac{I_0 \left[\left(\frac{K}{\bar{t}_n}\right) - \left(\frac{K}{\bar{t}_{n-1}}\right)\right]}{\bar{t}_n} \quad \text{Eq. 4d}$$

Kinetic Energy (T) in N·m

The kinetic energy generated by a rotating system within each successive phase segment (K) is expressed as:

$$T_1 = \tfrac{1}{2} I_0 \omega_1^2 \quad \text{Eq. 5a}$$

$$T_2 = \tfrac{1}{2} I_0 \omega_2^2 \quad \text{Eq. 5b}$$

$$T_n = \tfrac{1}{2} I_0 \omega_n^2 \quad \text{Eq. 5c}$$

Now, substituting Eq. 2c into Eq. 5c gives the general equation in terms of Segment Time ($\bar{t}$); that is:

$$T_n = 1/2 I_0 \left[\frac{K}{\bar{t}_n}\right]^2 \qquad \text{Eq. 5d}$$

Work (U) in N·m

The work generated by a rotating system within each successive phase segment (K) is expressed as the difference in kinetic energy (T); that is:

$$U_1 = T_1 - T_0 \qquad \text{Eq. 6a}$$

$$U_2 = T_2 - T_1 \qquad \text{Eq. 6b}$$

$$U_n = T_n - T_{n-1} \qquad \text{Eq. 6c}$$

Now, substituting Eq. 5d into Eq. 6c gives the general equation in terms of Segment Time ($\bar{t}$); that is:

$$U_n = 1/2 I_0 \left[\left(\frac{K}{\bar{t}_n}\right)^2 - \left(\frac{K}{\bar{t}_{n-1}}\right)^2\right] \qquad \text{Eq. 6d}$$

Power (P) in Watts (W)

The power generated by a rotating system within each successive phase segment (K) is expressed as the product of the torque (M) and the angular velocity ($\omega$); that is:

$$P_1 = M_1[\omega_a]_1 = M_1\left[\frac{\omega_1 + \omega_0}{2}\right] \qquad \text{Eq. 7a}$$

$$P_2 = M_2[\omega_a]_2 = M_2\left[\frac{\omega_2 + \omega_1}{2}\right] \qquad \text{Eq. 7b}$$

$$P_n = M_n[\omega_a]_n = M_n\left[\frac{\omega_n + \omega_{n-1}}{2}\right] \qquad \text{Eq. 7c}$$

Now, substituting Eq. 4d and Eq. 2c into Eq. 7c gives the general equation in terms of Segment Time ($\bar{t}$); that is:

$$P_n = I_0 \left[\frac{\left(\frac{K}{\bar{t}_n}\right) - \left(\frac{K}{\bar{t}_{n-1}}\right)}{\bar{t}_n}\right]\left[\frac{K}{\bar{t}_a}\right] \qquad \text{Eq. 7d}$$

Momentum ($H_0$) in N·m·s (newton·meter·sec)

The momentum generated by a rotating system within each successive phase segment (K) is expressed as the product of the mass moment of inertia ($I_0$) and the angular velocity ($\omega$); that is:

$$(H_0)_1 = I_O \omega_1 \qquad \text{Eq. 8a}$$

$$(H_0)_2 = I_0 \omega_2 \qquad \text{Eq. 8b}$$

$$(H_0)_n = I_0 \omega_n \qquad \text{Eq. 8c}$$

Now, substituting Eq. 2c into Eq. 8c gives the general equation in terms of Segment Time ($\bar{t}$); that is:

$$(H_0)_n = I_0 \left[\frac{K}{\bar{t}_n}\right] \qquad \text{Eq. 8d}$$

Impulse ($I_{mp}$) in N·m·s

The impulse generated by a rotating system within each successive phase segment (K) is expressed as the difference in momentum ($H_0$); that is:

$$(I_{mp})_1 = I_0(\omega_1 - \omega_0) \qquad \text{Eq. 9a}$$

$$(I_{mp})_2 = I_0(\omega_2 - \omega_1) \qquad \text{Eq. 9b}$$

$$(I_{mp})_n = I_0(\omega_n - \omega_{n-1}) \qquad \text{Eq. 9c}$$

Now, substituting Eq. 2c into Eq. 9c gives the general equation in terms of Segment Time ($\bar{t}$); that is:

$$(I_{mp})_n = I_0\left[\left(\frac{K}{\bar{t}_n}\right) - \left(\frac{K}{\bar{t}_{n-1}}\right)\right] \qquad \text{Eq. 9d}$$

BRIEF DESCRIPTION OF THE DRAWINGS

The following features are illustrative of the invention, both as to organization and method of operation. Further objects and advantages thereof will be better understood from the accompanying drawings in which several embodiments are illustrated by way of example. It is to be expressly understood, however, that the drawings are for the purpose of illustration and description only and are not intended as a definition of the limits of the invention.

FIG. 1-B is a large scale illustration of the System-Under-Test.

FIGS. 1-C and 1-D are graphs plotting angular displacement against phase segments in the system shown in FIG. 1-B.

FIG. 8 provides a listing of the phase-domain equations for angular motion about a fixed axis. The equations are provided for both the British and International System of units. Conversion factors are also provided.

FIG. 9 provides a listing of the Phase-Domain equations for rectilinear motion. The equations are provided for both the British and International System of units. Conversion factors are also provided.

DETAILED DESCRIPTION OF THE INVENTION

Figure 1A:
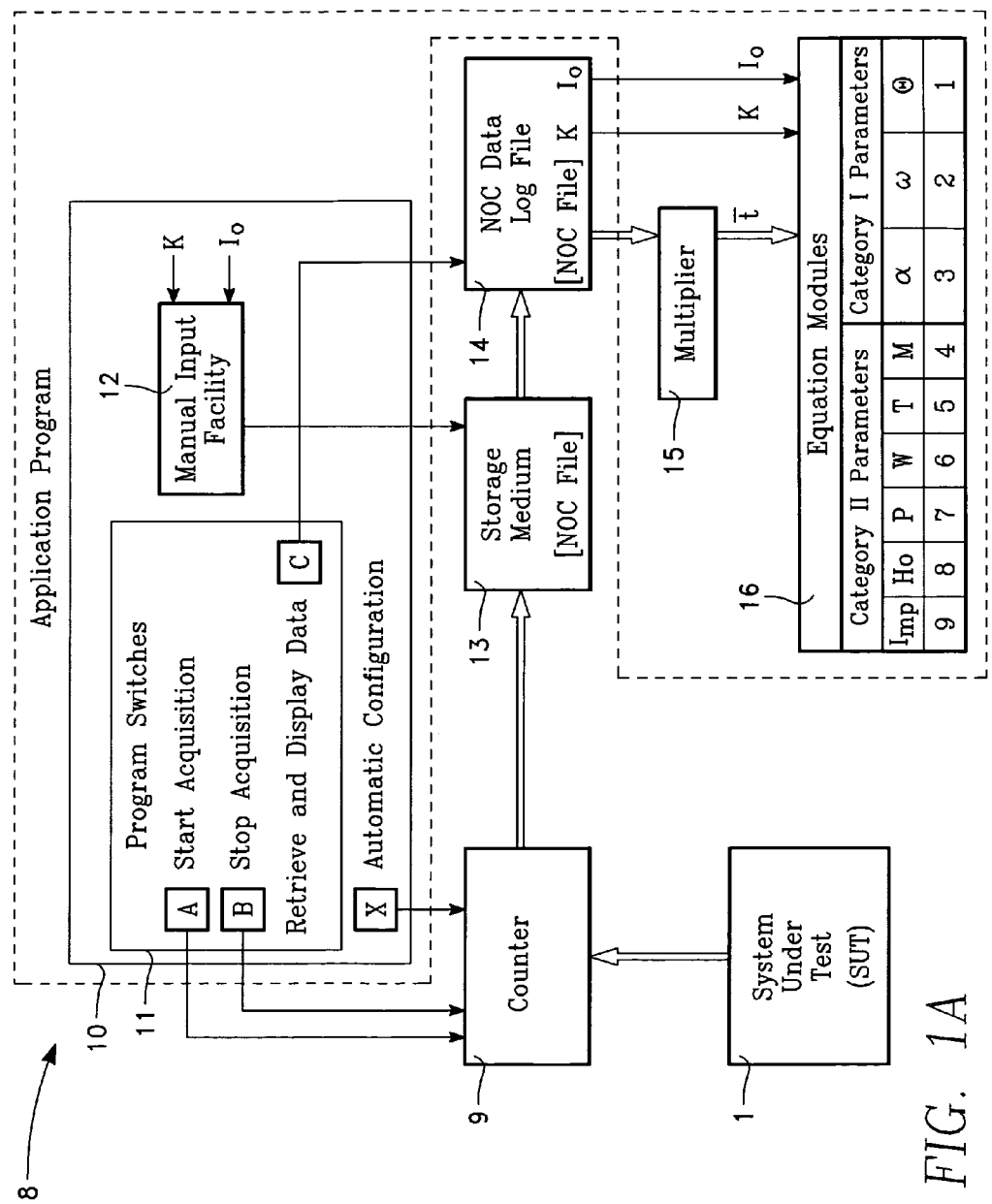
FIG. 1-A is a block diagram of the Dynamic Analyzer connected to the System-Under-Test (SUT). There is also shown a graphical display of the angular displacement parameter over two revolutions of the incremental encoder.
Figure 1B:
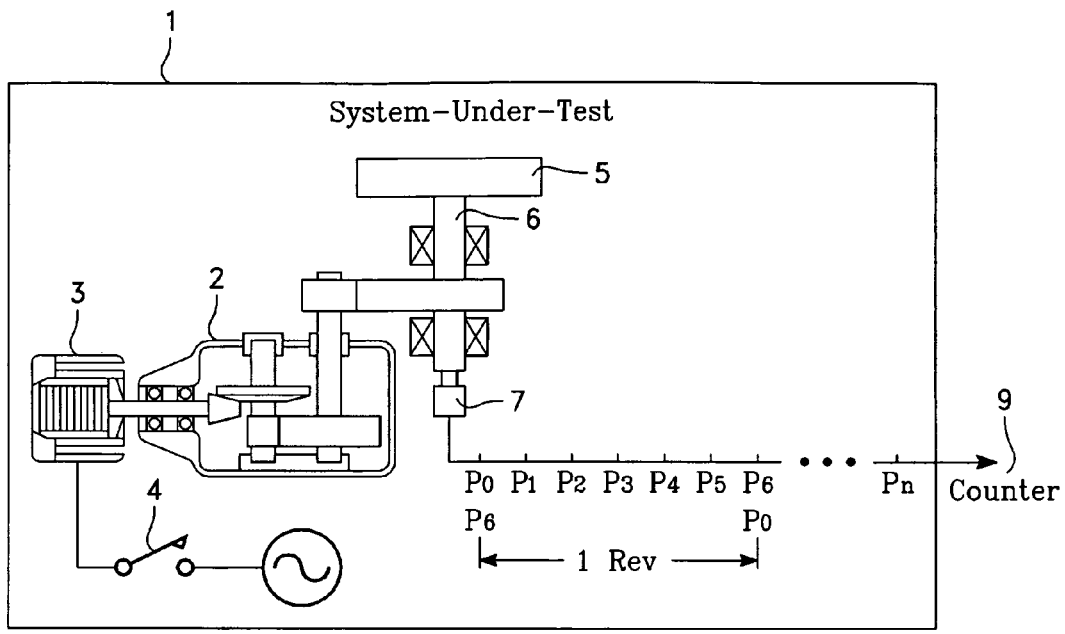
Figure 1C:
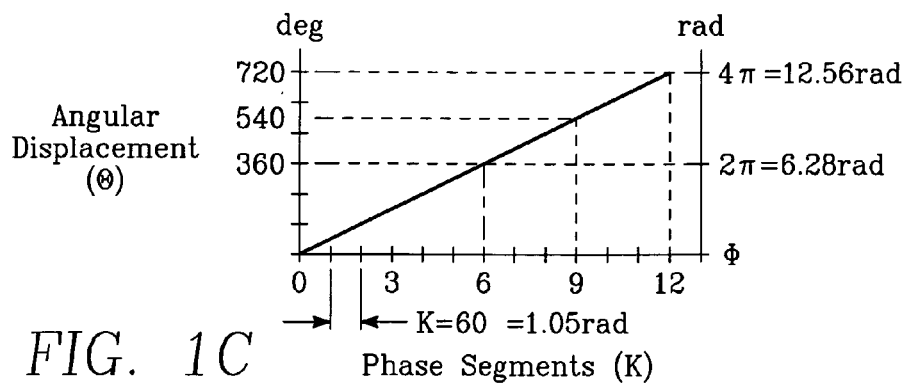
Figure 1D:
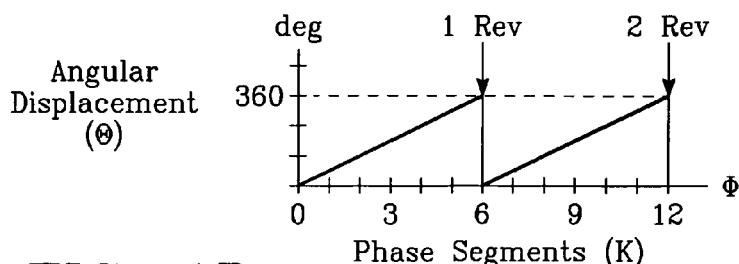

Turning to FIG. 1, there is shown the System-Under-Test (1) and the Dynamic Analyzer (8). The System-Under-Test (1) is illustrated in small scale. For the purpose of clarity, it is also illustrated in larger scale in FIG. 1-B.

The operation of the Dynamic Analyzer is described by way of the System-Under-Test (1) as it progresses from startup to shutdown.

The System-Under-Test (SUT)

The SUT (1) is comprised of a compound gearbox (2) driven by an electric motor (3). Switch (4) provides power to the electric motor. A flywheel (5) is connected to the output shaft (6). As indicated, the shaft speed is 5 RPM (i.e. 0.52 rad/s). An incremental shaft position encoder (7) is installed on the opposite end of the output shaft. The encoder generates six electronic pulses, equally spaced at K=60°, during each revolution of the said encoder. This pulse sequence is identified as $P_0$ through $P_6$ on the output line of the encoder. For ease of explanation, the encoder resolution has been limited to six (6) pulses/rev. Normally, encoders with resolutions of 1000 pulses/rev or more are utilized.

Below the diagram of the SUT (1), there are shown two graphs, A and B. They represent the angular displacement graphs which are ultimately derived and displayed by the Dynamic Analyzer.

Graph A represents two revolutions of the encoder; that is, twelve (12) Phase Segments (K). As indicated by the calculations below, the Phase Segment (K) is equal to 60° or 1.05 rad. The Phase Segments are located on the X-independent axis which is termed the phase axis ($\phi$); hence the term Phase-Domain Processing (PDP).

$$K = \frac{360°/\text{rev}}{6 \text{ pulses/rev}} = 60° \text{ between each successive pulse pair}$$

$$K = \frac{2\pi \text{ rad/rev}}{6 \text{ pulses/rev}} = 1.05 \text{ rad between each successive pulse pair}$$

Further, Graph A defines the angular displacement ($\theta$) for any Phase Segment (K). For example, at Phase Segment no. 9, the displacement is 540° (i.e. 9×60°). This straight-line, constant slope graph is the "signature" of Phase-Domain Processing (PDP). The graph remains constant under all speed conditions. This characteristic is the key to the unique fault detection capability of PDP.

Graph B is indicative of the number of revolutions of the output shaft. Specifically, the apex of each triangle represents one revolution. Thus, the two triangles represent two revolutions. Each successive group of six pulses represents one revolution.

The Dynamic Analyzer

Configuring the Dynamic Analyzer

The output of the encoder (7) is applied to the dynamic analyzer (8) at counter (9). The application program (10) contains three program switches (11) and the manual input facility (12). The small dotted lines outline those elements which are software.

The counter (9) is configured to establish the clock rate (20 MHz), the total count ($2^{32}$) and the mode of operation (period measurements). The configuration is accomplished by "switch X" during the start of the Application Program. The equation constants K and $I_0$ are entered into the Manual Input Facility (12).

Figure 2:
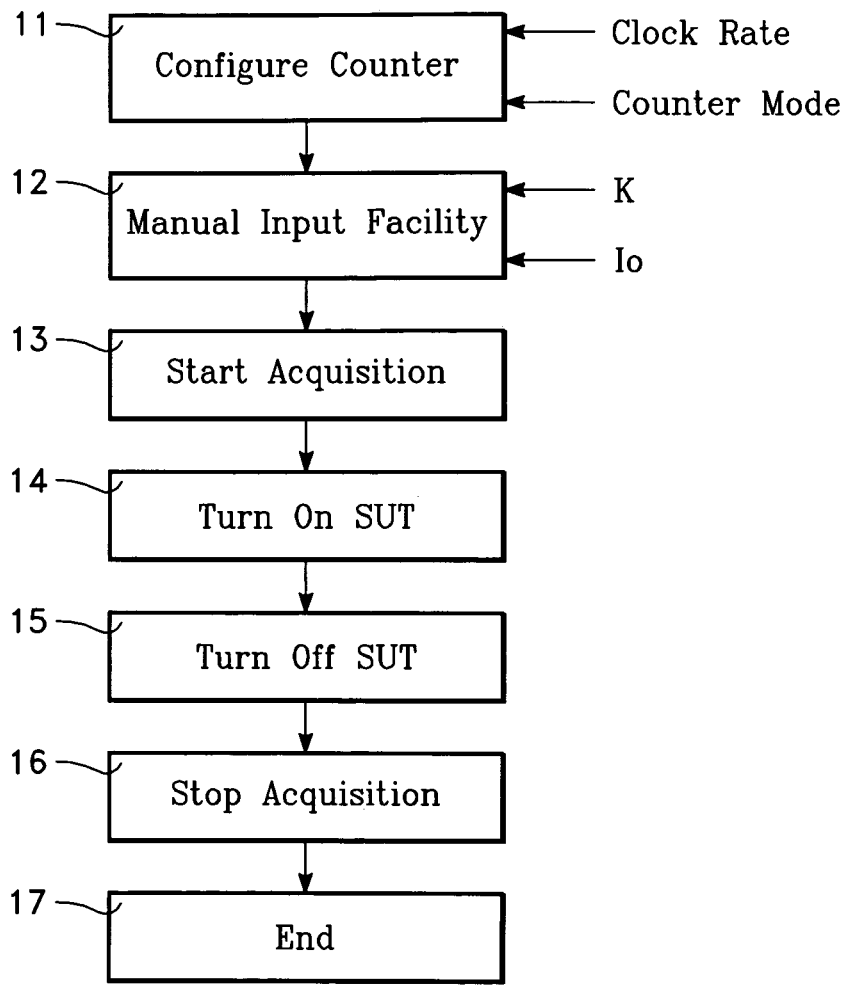
FIG. 2 is a flow diagram of the Data Acquisition and Storage phase of the invention. It reflects a summary of the text on the subject.

FIG. 2 illustrates in block diagram form the data acquisition and storage phase of the Dynamic Analyzer. Blocks 1 and 2 illustrate the configuring of the dynamic analyzer as described above. Blocks (3) through (6) illustrate the Start Acquisition through Stop Acquisition.

Operation of the Dynamic Analyzer

Data Acquisition and Storage

Upon pressing program switch A, Start Acquisition is initiated. This condition is illustrated in FIG. 2, Block (3). As a result, the application program is initiated, the counter is activated and attains a maximum NOC (number of counts). This NOC count is illustrated in FIG. 4, Graph A.

Upon closing switch (4), the motor (3) is activated and the SUT (1) begins to rotate. Further, the counter (9) begins to count the clock pulses between successive encoder pulses and streams the information to the storage medium (13) which is normally a hard disk or similar. The information on the storage medium is termed the NOC File. The counter (9) operates as follows.

1) Upon arrival of pulse $P_1$, the counter value latches to the counter internal buffer.
2) The counter is zeroed and starts counting up again until $P_2$ arrives. This procedure is continuous until switch B is pressed.

The action of turning on the SUT is illustrated in FIG. 2, Block 4, and in FIG. 4, Graph B. Concerning the latter, the horizontal line (i.e. Phase Segments 3 through 13) represents steady-state operation of the SUT. The 40×10⁶ counts represents 5 RPM of the output shaft (6).

The count of 40 million is extremely high due to the large value of angle K (i.e. 60°) and the slow speed of the SUT (i.e. 5 RPM). In many cases, the value of K may be small. For example, if the resolution (R) of the encoder were 1000 pulses/rev, the value of (K) would be 0.365° rather than 60°. As a result, the count would be reduced from 40 million (40×10⁶) to 24,333 counts.

Upon opening switch (4), the motor (3) is turned off and the output shaft (6) slows, then stops. The action of turning off the SUT is illustrated in FIG. 2, Block 5, and in FIG. 4, Graph C. Concerning the latter, shutdown begins at Phase Segment 13 and shaft/encoder rotation stops at Phase Segment 15. Again, the counter attains maximum count.

By pressing program switch B, Stop Acquisition occurs. As a result, the counter is turned off. Further, the buffered NOC data and the constants are transferred to the NOC Data Log File (14) from the storage medium (13). Stop acquisition is illustrated in FIG. 2, Block 6.

Operation of the Dynamic Analyzer

Retrieve and Display Data

Figure 3:
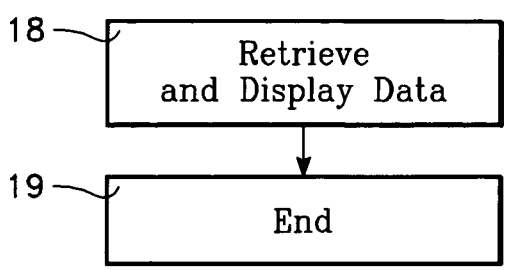
FIG. 3 is a flow diagram of the Data Retrieval and Display of the dynamic parameters.
Figure 4A:
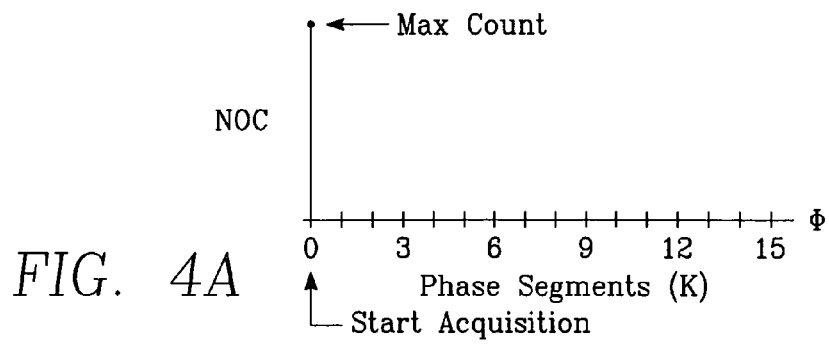
FIG. 4 illustrates the graphical development of the angular velocity ($\omega$) parameter from startup to shutdown of the System-Under-Test.
Figure 4B:
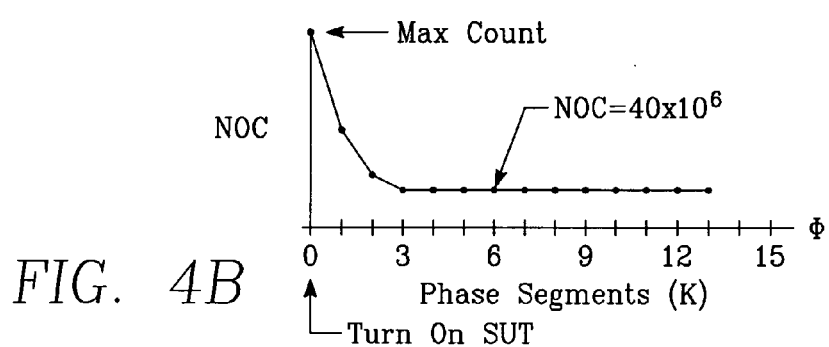
Figure 4C:
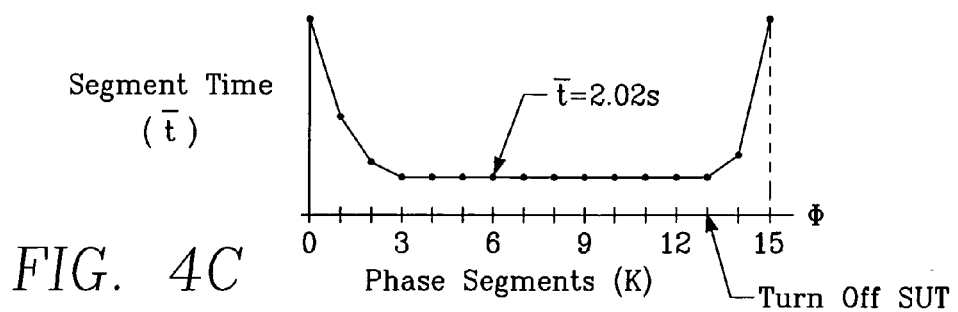
Figure 4D:
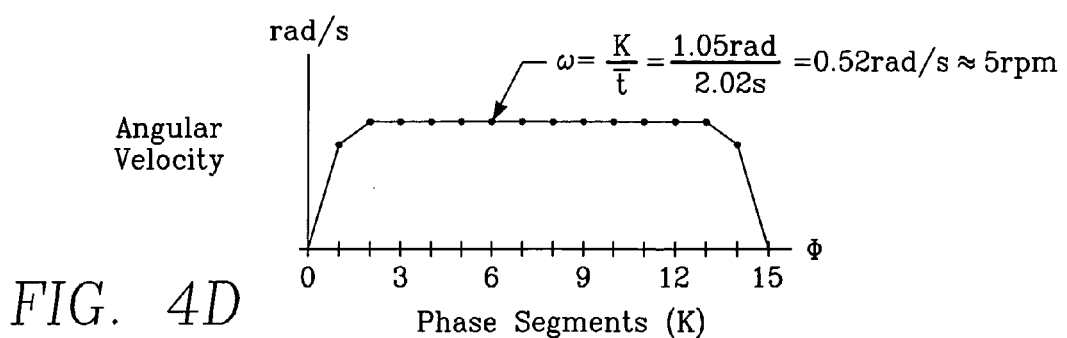

Upon pressing program switch C, the data is retrieved and displayed. This operation is illustrated in FIG. 3 by a single block. The parameters are generated as follows.

1) The multiplier (15) multiplies each successive NOC value by the clock period (i.e. 50 ns) to obtain the Segment Time ($\bar{t}$) and applies it to the equation modules (16). As indicated in FIG. 4, Graph C, the value of $\bar{t}$ in the steady-state region (i.e. Phase Segments 3 through 13) is 2.02 s.
2) The Segment Time ($\bar{t}$) is applied to all equation modules except no. 1. The value of K is applied to all modules (1 through 9); the value of $I_0$ is applied to modules 4 through 9.

Figure 5:
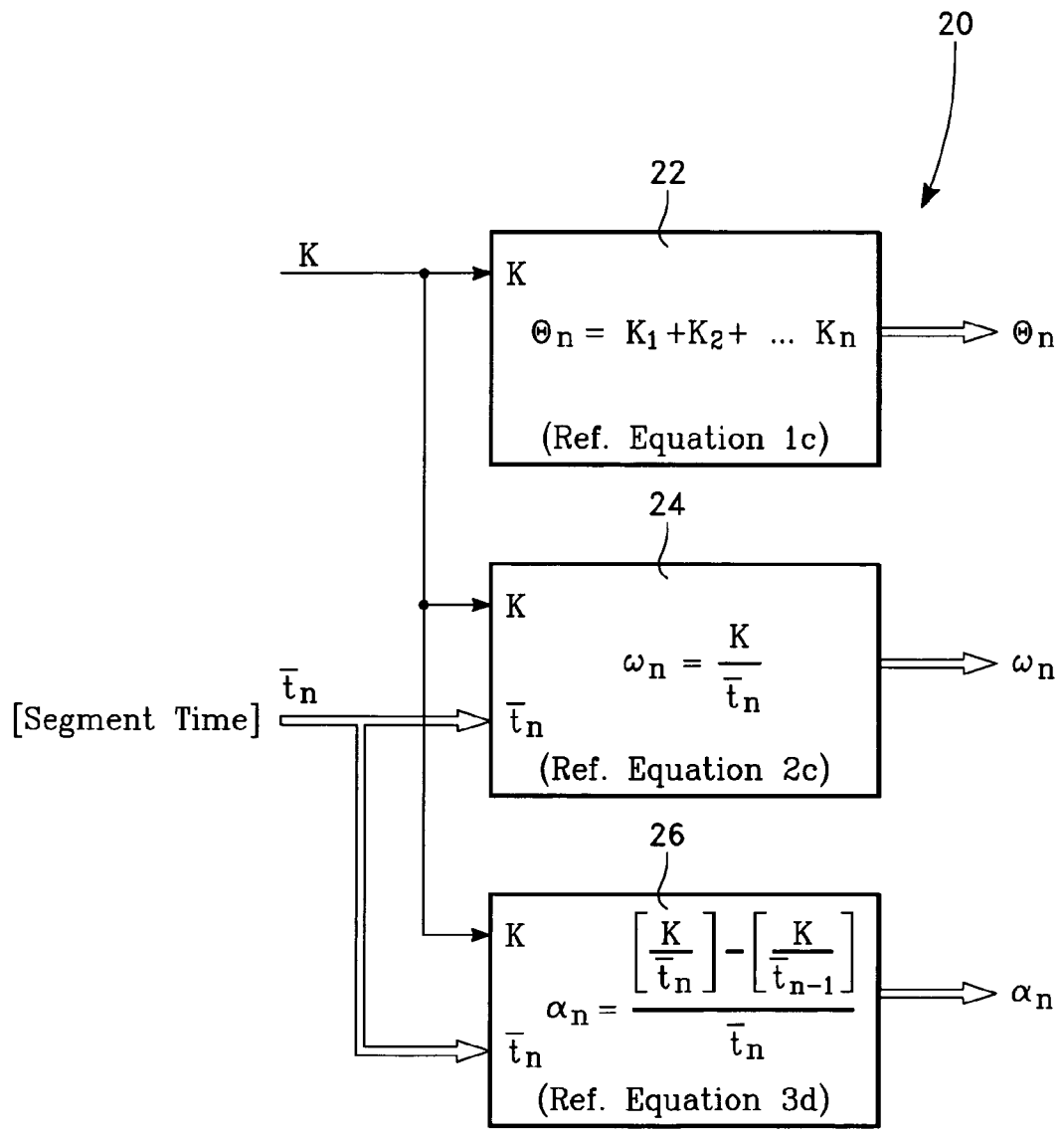
FIG. 5 illustrates the array design and equations for the Category I parameters.
Figure 6:
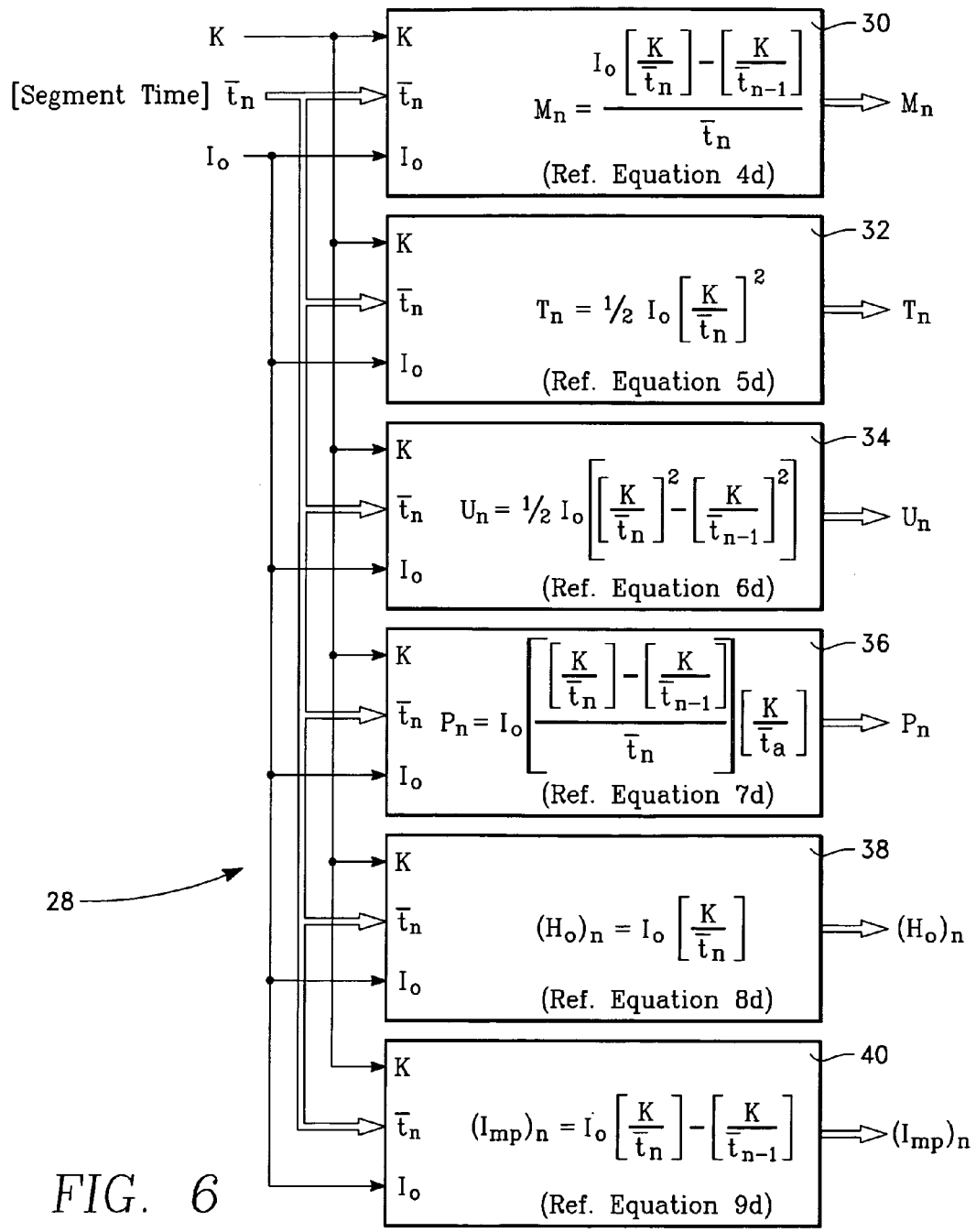
FIG. 6 illustrates the array design and equations for the Category II parameters.
Figure 7A:
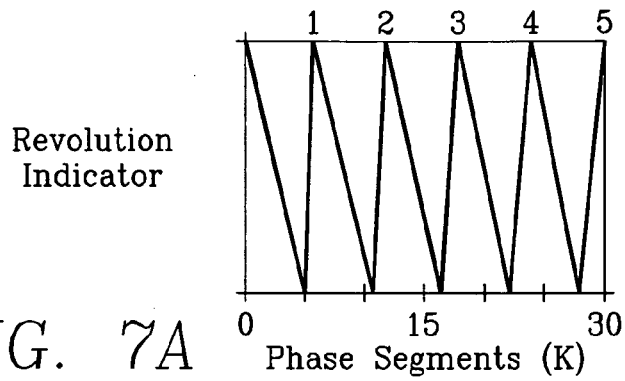
FIG. 7 represents the nine dynamic measurements generated by the Dynamic Analyzer as the system-under-test operates in three phases: startup, steady-state operation and shutdown.
Figure 7B:
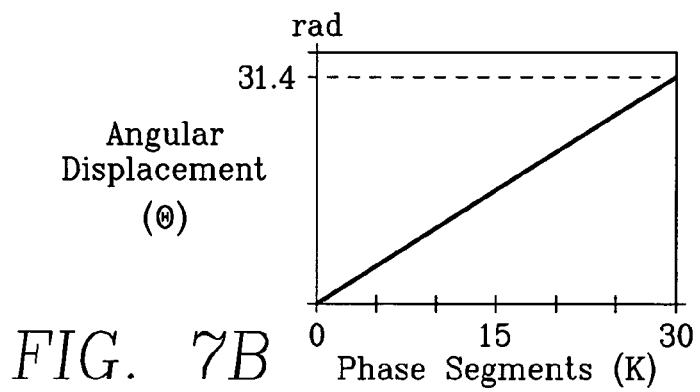
Figure 7C:
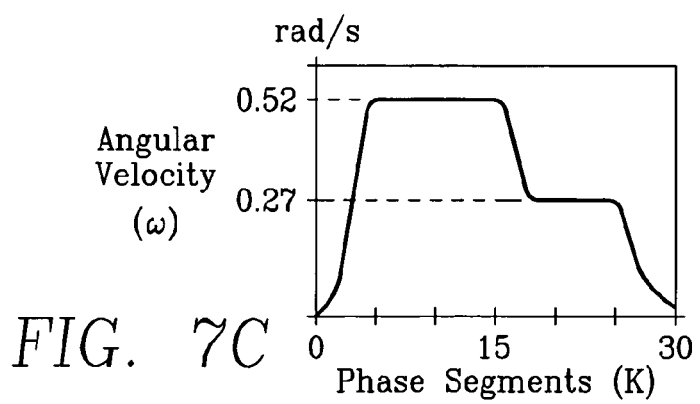
Figure 7D:
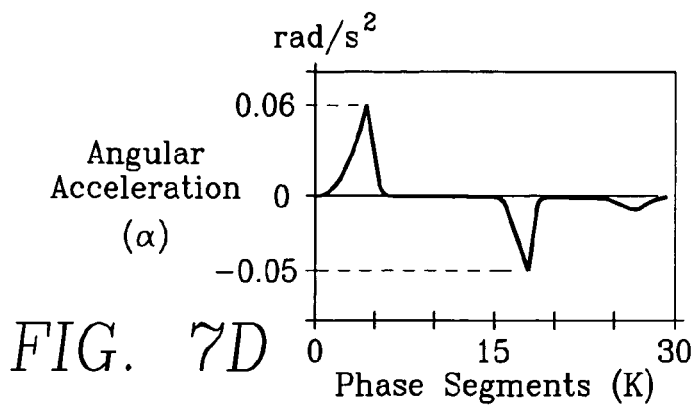
Figure 7E:
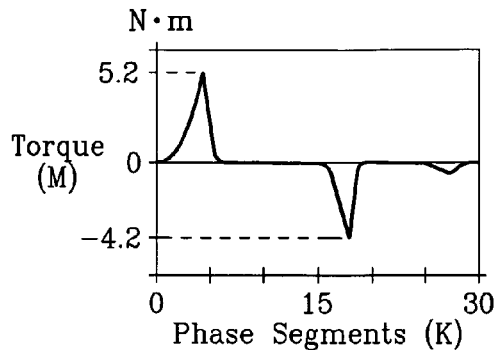
Figure 7H:
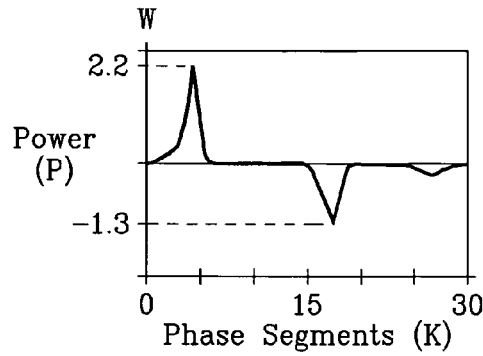
Figure 7F:
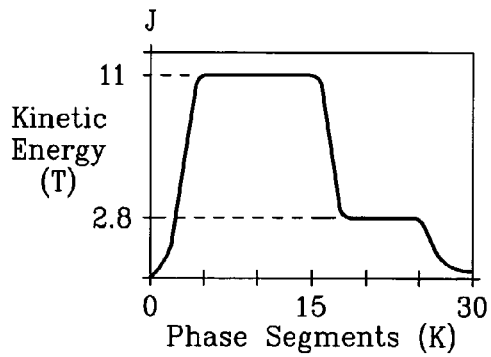
Figure 7I:
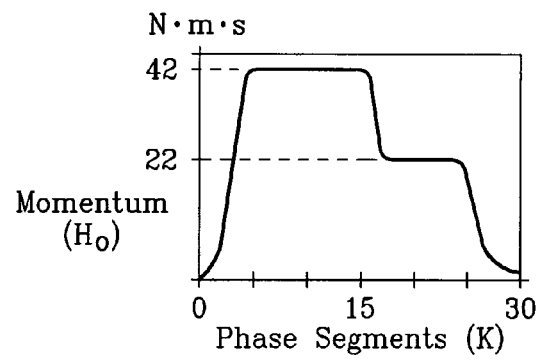
Figure 7G:
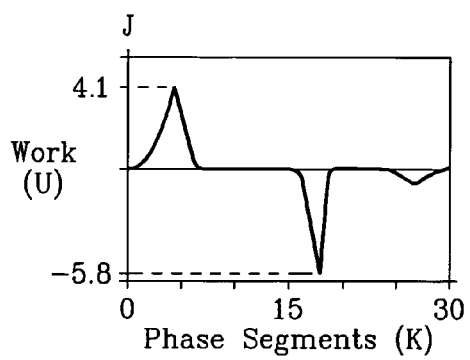
Figure 7J:
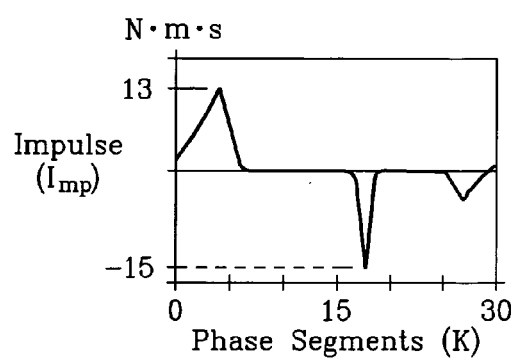

3) The equations within each module are illustrated in FIGS. 5 and 6. FIG. 5 shows the Category I parameters and FIG. 6 shows the Category II parameters. The equations are solved by array processing.

As an example of the array processing, the angular velocity graph (ω) is illustrated in FIG. 4, Graph D. As indicated in the steady-state region, the velocity value is 5 RPM (i.e. 0.52 rad/s). The calculation for the velocity values at the origin (O) and the steady-state region are $$\omega(\text{origin}) = \frac{K}{\bar{t}} = \frac{1.05 \text{ rad}}{NOC(\text{max})} = \frac{1.05 \text{ rad}}{\infty} = 0$$

Note: From a practical point of view, NOC max is equivalent to infinity (∞)

$$\omega(\text{continuous region}) = \frac{K}{\bar{t}} = \frac{1.05 \text{ rad}}{2.02 \text{ s}} = 0.52 \text{ rad/s} = 5 \text{ RPM}$$

A presentation of all nine dynamic parameters is provided in FIG. 7. This graph can be understood by inspecting the angular velocity parameter which is identified by an asterisk (*); an explanation follows.

1) During startup, the shaft speed attains a maximum plateau of 0.52 rad/s (i.e. 5 RPM). The speed then decreases to a plateau of 0.27 rad/s (i.e. 2.5 RPM) and then shutdown occurs.
2) Thirty (30) Phase Segments occurred. As indicated by the Revolution Indicator (top-left corner), this is equivalent to 5 revolutions of the output shaft (6).

PRIOR ART

U.S. patent to Schaub and Van Vliet (No. 4,320,662 dated Mar. 23, 1982) relates to a dynamic parameter generated and displayed in quasi-instantaneous, absolute units. In this method, elapsed-time measurements ($\bar{t}$) were measured between successive pulses generated by an incremental shaft encoder installed on the output shaft of a machine; the angular distance between the pulses (K) being expressed in radians. Thus, the angular velocity (ω) between each successive pulse pair (K) is expressed as follows:

$$\omega_1 = \frac{K}{\bar{t}_1} = \frac{\text{rad}}{\text{s}}$$

$$\omega_2 = \frac{K}{\bar{t}_2}$$

$$\omega_n = \frac{K}{\bar{t}_n}$$

The successive values of angular velocity ($\omega_n$) expressed in the above equations were then applied directly to a strip-chart recorder and displayed in the time-domain only.

In this prior art method, a measurement of angular acceleration was also derived by way of electronic differentiation, but this method of obtaining acceleration is unsatisfactory because the circuitry is both noisy and bandwidth limited.

The present invention of Schaub and Van Vliet offers two major advantages over their former invention:

1) it provides a method for deriving the full complement of dynamic parameters (nine total). These parameters can only be derived in the phase-domain as described in this disclosure.
2) the X-axis (i.e. the independent axis) displays the angular displacement (i.e. phase) of the encoder expressed as a succession of fixed, equal position events in the units of radians. Thus, it is feasible to precisely locate a fault within the machine cycle, independent of machine speed.

A machine cycle is defined as the number of revolutions the input shaft and the output shaft rotate before all gear teeth have returned to the start position on all gears. A machine cycle exists for both the input and output shaft.

The present invention has been put into practice and does not require calibration. The following statement published by the U.S. National Bureau of Standards provides strong evidence that the present invention is patentable:

Angular acceleration is difficult to measure primarily because such accelerometers are more difficult to design. Angular accelerometers tend to be large devices with low natural frequencies and difficult to calibrate. In fact, very few calibration methods have been developed.

One design uses a balanced beam, able to rotate about a center suspension. Springs keep the beam in a fixed position normally. The beam deflects when angular acceleration acts on it and thus deflection (displacement) produces an output signal. Liquid damping is provided between the beam and enclosure.

In another design, liquid in a ring-shaped enclosure, in response to angular acceleration, provides a reaction force on a fixed "paddle". The deflection of this paddle is sensed electrically.

In a further design, angular motion is sensed with the aid of two linear accelerometers mounted equidistant from the axis of rotation about which motion is to be measured.

Reference Document:
NBS Special Publication 615
U.S. Department of Commerce/National Bureau of Standards

What is claimed is:

1. An apparatus for providing measurements indicative of incremental angular displacement of a machine element which is a member of a mechanical motion transmission system:

a) A displacement sensing means coupled to said machine element and responsive to motion thereof through indicative, small, equal segments of displacement (K) of said machine element for generating a signal for each occurrence of small motion thereof, said motion being a fraction of a full-cycle of operation;

b) means responsive to at least one said signal for providing an indication of one cycle of operation of said machine element;

c) signal processing means for displaying the small equal segments of displacement (K) on a Cartesian coordinate or other suitable graph whereby the said segments of displacement (K) are equally spaced and sequentially numbered on the X-axis and identified as $K_1, K_2 \ldots K_n$, whereby the subscripts 1,2, ... n identify the sequence numbers, the said X-axis being referred to as the phase-domain axis; and d) signal processing means to provide a measurement of displacement of the machine element by way of successive addition of the equal segments of displacement (K), thereby producing the Y-axis on said graph.

2. An apparatus for providing quasi-instantaneous measurements indicative of angular velocity of a machine element, which is a member of a mechanical motion transmission system comprising:
  a) placement sensing means in accordance with claim 1;
  b) signal processing means responsive to each successive segment of displacement (K) of said machine element for providing elapsed-time measurements ($\bar{t}$) within said equal segment of displacement (K); and
  c) additional signal processing means for providing measurements of angular velocity ($\omega$) on a signal-by-signal basis from elapsed-time measurements ($\bar{t}$); said measurements being derived by dividing [K] by [$\bar{t}$] and being expressed in dimensions of rad/s.

3. An apparatus for providing quasi-instantaneous measurements indicative of angular acceleration ($\alpha$) of a machine element which is a member of a mechanical motion transmission system comprising:
  a) a displacement sensing means coupled to said machine element and responsive to motion thereof through indicative, small, equal segments of displacement (K) of said machine element for generating a signal for each occurrence of small motion thereof, said motion being a fraction of a full-cycle of operation; and
  b) signal processing means for providing measurements of acceleration on a signal-by-signal basis by taking the difference between each consecutive pair of velocity measurements, said measurements being derived in accordance with claim 2, and dividing the said difference by the latter elapsed-time measurement ($\bar{t}$) (i.e. $\alpha_1=(\omega_1-\omega_0)/\bar{t}_1$, $\alpha_2=(\omega_2-\omega_1)/\bar{t}_2$, ... etc.) and being expressed in units of rad/s$^2$.

4. An apparatus for providing quasi-instantaneous measurements indicative of moment of force (M) of a machine element which is a member of a mechanical motion transmission system comprising:
  a) a displacement sensing means in accordance with claim 1; and
  b) signal processing means for providing measurements of moment of force on a signal-by-signal basis by taking the product of the mass moment of inertia ($I_0$) in units of kg·m$^2$ and angular acceleration ($\omega$) in units of rad/s$^2$ and being expressed in units of N·m (newton-meters).

5. An apparatus for providing quasi-instantaneous measurements indicative of angular kinetic energy (T) of a machine element which is a member of a mechanical motion transmission system comprising:
  a) a displacement sensing means in accordance with claim 1; and
  b) a signal processing means for providing measurements of kinetic energy on a signal-by-signal basis by taking one-half of the product of the moment of inertia ($I_0$) and the angular velocity ($\omega$) to the second power (i.e. $T=\frac{1}{2}I_0\omega^2$) and being expressed in units of joules (J).

6. An apparatus for providing quasi-instantaneous measurements indicative of angular work (U) of a machine element which is a member of a mechanical motion transmission system comprising:
  a) a displacement sensing means coupled to said machine element and responsive to motion thereof through indicative, small, equal segments of displacement (K) of said machine element for generating a signal for each occurrence of small motion thereof, said motion being a fraction of a full-cycle of operation; and
  b) a signal processing means for providing measurements of work (U) on a signal-by-signal basis by taking the difference between each consecutive pair of kinetic energy measurements, said measurements being derived in accordance with claim 5, and being expressed in units of joules (J).

7. An apparatus for providing quasi-instantaneous measurements indicative of angular power (P) of a machine element which is a member of a mechanical motion transmission system comprising:
  a) a displacement sensing means coupled to said machine element and responsive to motion thereof through indicative, small, equal segments of displacement (K) of said machine element for generating a signal for each occurrence of small motion thereof, said motion being a fraction of a full-cycle of operation; and
  b) signal processing means for providing measurements of power (P) on a signal-by-signal basis by taking the product of the moment of force (M) in accordance with claim 4 and the average angular velocity ($\omega_a$) and being expressed in units of J/s (joules/s) or watts (W).

8. An apparatus for providing quasi-instantaneous measurements indicative of angular momentum ($H_0$) of a machine element which is a member of a mechanical motion transmission system comprising:
  a) a displacement sensing means coupled to said machine element and responsive to motion thereof through indicative, small, equal segments of displacement (K) of said machine element for generating a signal for each occurrence of small motion thereof, said motion being a fraction of a full-cycle of operation; and
  b) signal processing means for providing measurements of momentum ($H_0$) on a signal-by-signal basis by taking the product of the mass moment of inertia ($I_0$) and the angular velocity ($\omega$) in accordance with claim 2 being expressed in units of N·m·s (newton-meter-seconds).

9. An apparatus for providing quasi-instantaneous measurements indicative of angular impulse ($I_{mp}$) of a machine element which is a member of a mechanical motion transmission system comprising:
  a) a displacement sensing means coupled to said machine element responsive to motion thereof through indicative, small, equal segments of displacement (K) of said machine element for generating a signal for each occurrence of small motion thereof, said motion being a fraction of a full-cycle of operation; and
  b) signal processing means for providing measurements of impulse ($I_{mp}$) on a signal-by-signal basis by taking the difference between each consecutive pair of momentum ($H_0$) measurements, said momentum measurements being derived in accordance with claim 8 and being expressed in units of N·m·s (newton-meter-seconds).

10. An apparatus for providing measurements indicative of incremental rectilinear displacement of a machine element which is a member of mechanical motion transmission system:
  a) a displacement sensing means coupled to said machine element and responsive to motion thereof through indicative, small, equal segments of displacement (L) of said machine element for generating a signal for each occurrence of small motion thereof, said motion being a fraction of a full-cycle of operation; and
  b) means responsive to at least one said signal for providing an indication of one cycle of operation of said machine element;
  c) signal processing means for displaying the small equal segments of displacement (L) on a Cartesian coordinate or other suitable graph whereby the said segments of displacement (L) are equally spaced and sequentially numbered on the X-axis and identified as $L_1, L_2 \ldots L_n$ wherein the subscripts 1, 2 ... n identify the sequence numbers, the said X-axis being referred to as the phase-domain axis; and d) signal processing means to provide a measurement of displacement of the machine element by way of successive addition of equal segments of displacement (L), thereby producing the Y-axis of said graph, and a measurement of displacement in radians from the X-Y origin of any segment of displacement ($L_n$) located on the phase-domain axis.

11. An apparatus for providing quasi-instantaneous measurements indicative of rectilinear velocity (v) of a machine element, which is a member of a mechanical motion transmission system comprising:

a) a displacement sensing means in accordance with claim 10;

b) signal processing means responsive to each successive segment of displacement (L) of said machine element for providing elapsed-time measurements ($\bar{t}$) within said equal segment of displacement (L); and c) additional signal processing means for providing measurements of angular velocity (v) on a signal-by-signal basis from elapsed-time measurements ($\bar{t}$); said measurements being derived mathematically by dividing [L] by [$\bar{t}$] and being expressed in dimensions of m/s (meters per second).

12. An apparatus for providing quasi-instantaneous measurements indicative of rectilinear acceleration (a) of a machine element which is a member of a mechanical motion transmission system comprising:

a) a displacement sensing means/a rectilinear motion encoder coupled to said machine element and responsive to motion thereof through indicative, small, equal segments of displacement (L) of said machine element for generating a signal for each occurrence of small motion thereof, said motion being a fraction of a full-cycle of operation; and b) signal processing means for providing measurements of linear acceleration (a) on a signal-by-signal basis by taking the difference between each consecutive pair of velocity measurements, said measurements being derived in accordance with claim 10 and dividing said difference by the latter elapsed-time measurement ($\bar{t}$) [i.e. $a_1=(v_1-v_0)/\bar{t}_1$; $a_2=(v_2-v_1)/\bar{t}_2$ ... etc.] and being expressed in units of m/s$^2$.

13. An apparatus for providing quasi-instantaneous measurements indicative of rectilinear force (F) of a machine element which is a member of a mechanical motion transmission system comprising:

a) a displacement sensing means in accordance with claim 10; and b) A signal processing means for providing measurements of force (F) on a signal-by-signal basis by taking the product of the mass (m) in the units of kilograms (kg) and linear acceleration (a) in units of m/s$^2$ and being expressed in units of N (newtons).

14. An apparatus for providing quasi-instantaneous measurements indicative of rectilinear kinetic energy (T) of a machine element which is a member of a mechanical motion transmission system comprising:

a) a displacement sensing means in accordance with claim 10; and b) signal processing means for providing measurements of kinetic energy on a signal-by-signal basis by taking one-half of the product of the mass (m) and the linear velocity (v) to the second power (i.e. $T=\frac{1}{2}mv^2$) and being expressed in units of joules (J).

15. An apparatus for providing quasi-instantaneous measurements indicative of rectilinear work (U) of a machine element which is a member of a mechanical motion transmission system comprising:

a) a displacement sensing means (i.e. a rectilinear motion encoder) coupled to said machine element and responsive to motion thereof through indicative, small, equal segments of displacement (L) of said machine element for generating a signal for each occurrence of small motion thereof, said motion being a fraction of a full-cycle of operation; and b) signal processing means for providing measurements of work (U) on a signal-by-signal basis by taking the difference between each consecutive pair of kinetic energy measurements, said measurements being derived in accordance with claim 13, and being expressed in units of joules (J).

16. An apparatus for providing quasi-instantaneous measurements indicative of rectilinear power (P) of a machine element which is a member of a mechanical motion transmission system comprising:

a) a displacement sensing means (i.e. a rectilinear motion encoder) coupled to said machine element and responsive to motion thereof through indicative, small, equal segments of displacement (L) of said machine element for generating a signal for each occurrence of small motion thereof, said motion being a fraction of full-cycle of operation; and b) signal processing means for providing measurements of power (P) on a signal-by-signal basis by taking the product of the force (F) in accordance with claim 13 and the average linear velocity ($v_a$) and being expressed in units of J/s (joules/s) or watts (W).

17. An apparatus for providing quasi-instantaneous measurements indicative of rectilinear momentum (G) of a machine element which is a member of a mechanical motion transmission system comprising:

a) a displacement sensing means in accordance with claim 10; and b) a signal processing means for providing measurements of momentum (G) on a signal-by-signal basis by taking the product of the mass (m) and the linear velocity (v) and being expressed in units of N·s (newton-seconds).

18. An apparatus for providing quasi-instantaneous measurements indicative of rectilinear impulse ($I_{mp}$) of a machine element which is a member of a mechanical motion transmission system comprising:

a) a displacement sensing means coupled to said machine element and responsive to motion thereof through indicative, small, equal segments of displacement (L) of said machine element for generating a signal for each occurrence of small motion thereof, said motion being a fraction of a full-cycle of operation; and b) signal processing means for providing measurements of impulse ($I_{mp}$) on a signal-by-signal basis by taking the difference between each consecutive pair of momentum (G) measurements, said momentum measurements being derived in accordance with claim 17 and being expressed in units of N·s (newton-seconds).

* * * * *